United States Patent
Miono et al.

(10) Patent No.: US 10,030,297 B2
(45) Date of Patent: Jul. 24, 2018

(54) METHOD FOR PRODUCING A HOT-DIP ALUMINUM-COATED STEEL WIRE

(71) Applicant: NISSHIN STEEL CO., LTD., Tokyo (JP)

(72) Inventors: Tadaaki Miono, Osaka (JP); Shinichi Kamoshida, Osaka (JP); Yasunori Hattori, Osaka (JP); Takeshi Shimizu, Tokyo (JP)

(73) Assignee: NISSHIN STEEL CO., LTD., Tokyo (JP)

( * ) Notice: Subject to any disclaimer, the term of this patent is extended or adjusted under 35 U.S.C. 154(b) by 0 days.

(21) Appl. No.: 15/219,471

(22) Filed: Jul. 26, 2016

(65) Prior Publication Data

US 2018/0030583 A1    Feb. 1, 2018

(51) Int. Cl.

| | |
|---|---|
| *B05D 1/18* | (2006.01) |
| *C23C 2/38* | (2006.01) |
| *C23C 2/12* | (2006.01) |
| *C23C 2/18* | (2006.01) |
| *C23C 2/26* | (2006.01) |

(Continued)

(52) U.S. Cl.
CPC .................. *C23C 2/38* (2013.01); *B05C 3/00* (2013.01); *B23H 7/00* (2013.01); *C21D 1/00* (2013.01); *C21D 6/00* (2013.01); *C21D 8/00* (2013.01); *C21D 9/00* (2013.01); *C23C 2/12* (2013.01); *C23C 2/185* (2013.01); *C23C 2/26* (2013.01); *F26B 21/00* (2013.01); *C21D 2211/00* (2013.01); *Y10S 118/00* (2013.01); *Y10S 505/00* (2013.01)

(58) Field of Classification Search
CPC ......... C23C 2/00; C21D 9/00; C21D 2211/00; C21D 6/00; C21D 1/00; C21D 8/00
See application file for complete search history.

(56) References Cited

U.S. PATENT DOCUMENTS

2007/0017691 A1    1/2007   Izumida et al.
2014/0366802 A1*  12/2014   Itoh .......................... C23C 2/003
                                                                    118/712

FOREIGN PATENT DOCUMENTS

| JP | 51-93815 U | 7/1976 |
| JP | 2006-339040 A | 12/2006 |

(Continued)

OTHER PUBLICATIONS

International Search Report dated Sep. 2, 2014 in PCT/JP2014/067766 (4 pages).

*Primary Examiner* — Gordon Baldwin
*Assistant Examiner* — Mohammad Mayy
(74) *Attorney, Agent, or Firm* — Rothwell, Figg, Ernst & Manbeck, P.C.

(57) ABSTRACT

A method for producing a hot-dip aluminum-coated steel wire, including dipping a steel wire in molten aluminum, and drawing up the steel wire from the molten aluminum, wherein at the time of drawing up the steel wire from the molten aluminum, a stabilization member is contacted with a surface of the molten aluminum and the steel wire at the boundary between the steel wire and the surface of the molten aluminum, a nozzle having a tip end of which inside diameter is 1 to 15 mm is disposed so that the tip end is positioned at a place away from the steel wire by a distance of 1 to 50 mm, and an inert gas having a temperature of 200 to 800° C. is blown out from the tip end to the boundary at a volume flow rate of 2 to 200 L/min.

1 Claim, 2 Drawing Sheets

(51) Int. Cl.
  *C21D 9/00*   (2006.01)
  *C21D 6/00*   (2006.01)
  *C21D 8/00*   (2006.01)
  *F26B 21/00*  (2006.01)
  *B23H 7/00*   (2006.01)
  *C21D 1/00*   (2006.01)
  *B05C 3/00*   (2006.01)

(56) References Cited

FOREIGN PATENT DOCUMENTS

| | | | | |
|---|---|---|---|---|
| JP | 2011-208263 | A | 10/2011 | |
| JP | 2014-40656 | A | 3/2014 | |
| JP | 2014/185355 | * | 10/2014 | ............... C23C 2/12 |
| JP | 2014-185355 | A | 10/2014 | |
| WO | 2005/024851 | A1 | 3/2005 | |
| WO | 2016/002040 | A1 | 1/2016 | |

* cited by examiner

METHOD FOR PRODUCING A HOT-DIP ALUMINUM-COATED STEEL WIRE

FIELD OF THE INVENTION

The present invention relates to a method for producing a hot-dip aluminum-coated steel wire, and more particularly to a method for producing a hot-dip aluminum-coated steel wire which can be suitably used in, for example, a wire harness of an automobile and the like.

In the present specification, the hot-dip aluminum-coated steel wire means a steel wire which has been subjected to aluminum plating by dipping a steel wire in molten aluminum, and then continuously drawing up the steel wire from the molten aluminum.

BACKGROUND OF THE INVENTION

A copper wire has been hitherto used as an electric wire which is used in a wire harness of an automobile and the like. In recent years, lightness has been required for the electric wire. Therefore, development of an electric wire having a weight lighter than a copper wire has been desired.

As a metallic wire having a weight lighter than a copper wire, Japanese Patent Unexamined Publication No. 2014-185355 discloses a hot-dip Al-coated steel wire obtained by subjecting a steel wire to hot-dip aluminum-plating. More specifically, the hot-dip Al-coated steel wire is produced by dipping a steel wire which may have a zinc plated layer or a nickel plated layer on its surface in molten aluminum, and then continuously drawing up the steel wire from the molten aluminum to the air.

SUMMARY OF THE INVENTION

Problems to be Solved by the Invention

According to the above process, when the steel wire is drawn up from the molten aluminum at high speed, for example, at a speed of 200 m/min or more, a phenomenon of fine vibration (pulsation phenomenon) of the surface of the hot-dip aluminum bath occurs, and a size of meniscus of the molten aluminum varies. Therefore, the amount of the molten aluminum deposited on the surface of the steel wire which is drawn up from the molten aluminum varies, and thus the diameter of an obtained hot-dip Al-coated steel wire sometimes becomes uneven.

Moreover, according to the above process, when the steel wire is subjected to hot-dip aluminum plating, an aluminum lump is sometimes deposited on the surface of the steel wire. When the steel wire having an aluminum lump on its surface is subjected to a wire drawing process using some dies, the steel wire is sometimes broken during passing the steel wire through a die at an initial stage of the wire drawing process.

Object of the Invention

An object of the present invention is to provide a method for efficiently producing a hot-dip aluminum-coated steel wire having a uniform diameter and little aluminum lump on its surface.

Means for Solving the Problems

The present invention relates to a method for producing a hot-dip aluminum-coated steel wire, which includes dipping a steel wire in molten aluminum, and then continuously drawing up the steel wire from the molten aluminum, to produce the hot-dip aluminum-coated steel wire, wherein at the time of drawing up the steel wire from the molten aluminum, a stabilization member is contacted with a surface of the molten aluminum and the steel wire at the boundary between the steel wire and the surface of the molten aluminum, a nozzle having a tip end of which inside diameter is 1 to 15 mm is disposed so that the tip end is positioned at a place away from the steel wire by a distance of 1 to 50 mm, and an inert gas having a temperature of 200 to 800° C. is blown out from the tip end to the boundary between the steel wire and the surface of the molten aluminum at a volume flow rate of 2 to 200 L/min.

Effects of the Invention

According to the method for producing a hot-dip aluminum-coated steel wire of the present invention, a hot-dip aluminum-coated steel wire having a uniform diameter and little aluminum lump on its surface can be efficiently produced.

DETAILED DESCRIPTION OF THE INVENTION

As mentioned above, the present invention relates to a method for producing a hot-dip aluminum-coated steel wire, which includes dipping a steel wire in molten aluminum, and then continuously drawing up the steel wire from the molten aluminum, to produce the hot-dip aluminum-coated steel wire, wherein at the time of drawing up the steel wire from the molten aluminum, a stabilization member is contacted with the surface of the molten aluminum and the steel wire at the boundary between the steel wire and the surface of the molten aluminum, a nozzle having a tip end of which inside diameter is 1 to 15 mm is disposed so that the tip end is positioned at a place away from the steel wire by a distance of 1 to 50 mm, and an inert gas having a temperature of 200 to 800° C. is blown out from the tip end to the boundary between the steel wire and the surface of the molten aluminum at a volume flow rate of 2 to 200 L/min.

In the method for producing a hot-dip aluminum-coated steel wire according to the present invention, since the above operations are employed, a hot-dip aluminum-coated steel wire having a uniform diameter and little lump on its surface can be efficiently produced.

Hereinafter, the method for producing a hot-dip aluminum-coated steel wire of the present invention will be more specifically described based on drawings. However, the present invention is not limited only to those embodiments described in the drawings.

Figure 1:
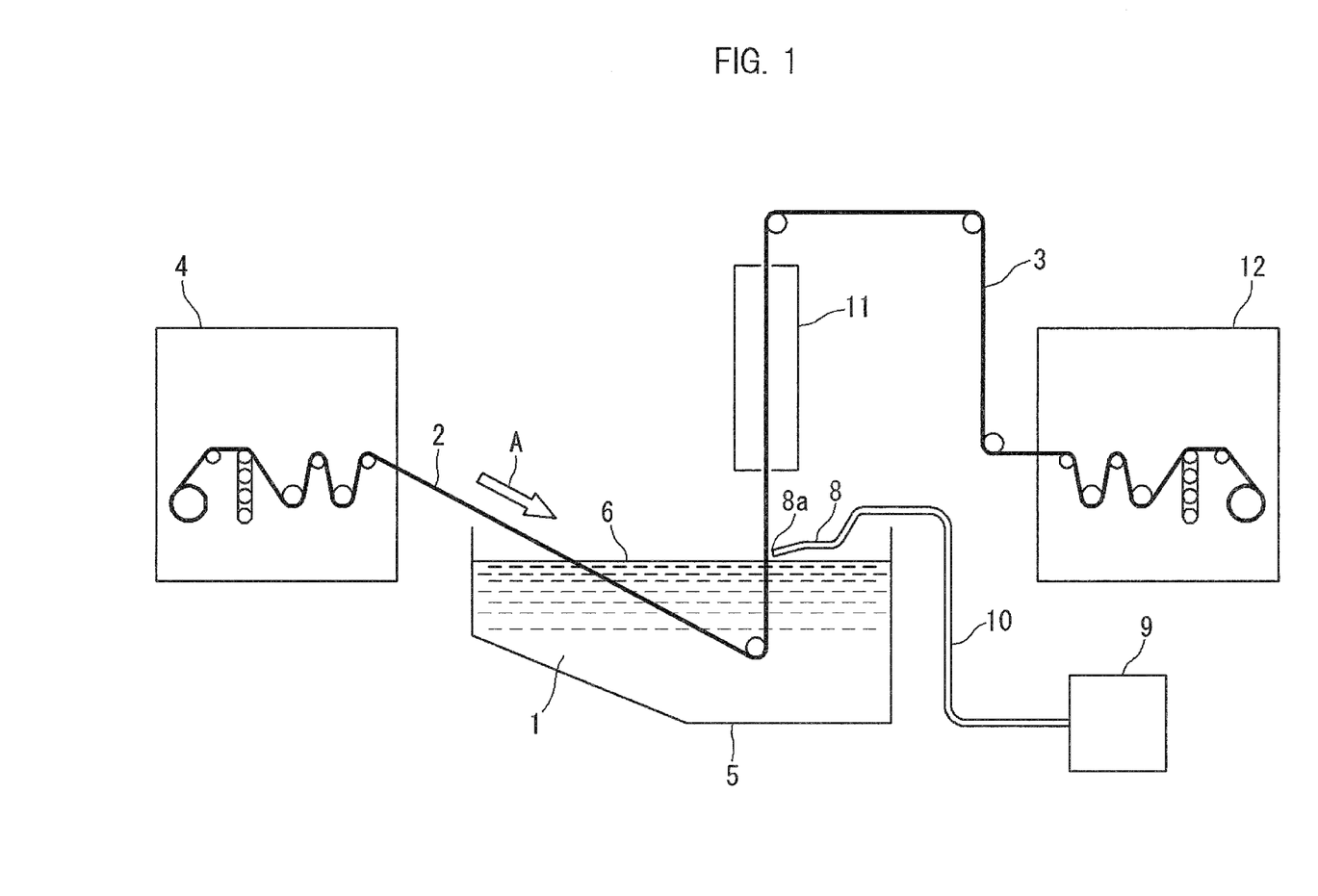
FIG. 1 is a schematic cross-sectional view illustrating an embodiment of a method for producing a hot-dip aluminum-coated steel wire according to the present invention.
Figure 2:
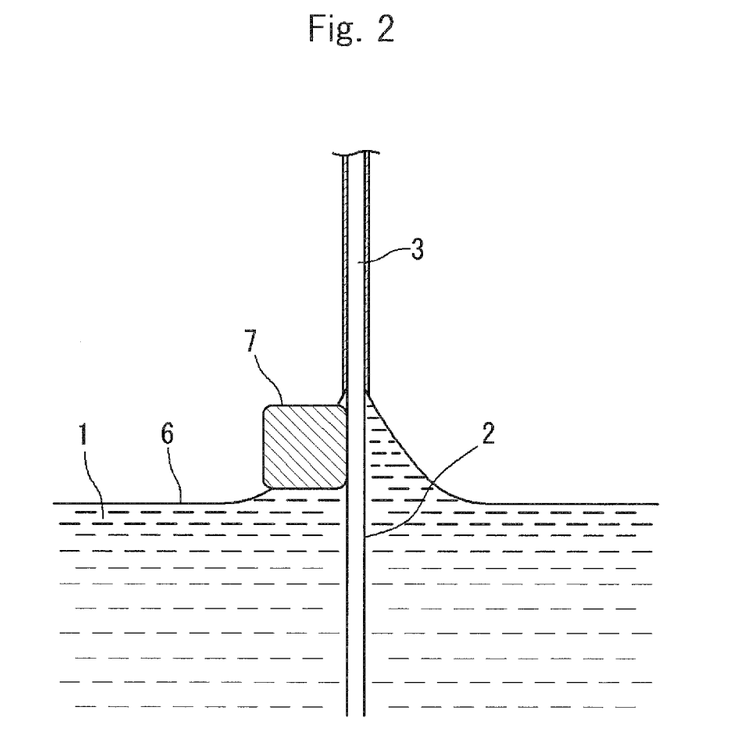
FIG. 2 is a schematic cross-sectional view illustrating a boundary between the steel wire and the surface of molten aluminum placed in a plating bath when the steel wire is drawn up from the molten aluminum in the method according to the present invention.

FIG. 1 is a schematic cross-sectional view illustrating an embodiment of a method for producing a hot-dip aluminum-coated steel wire of the present invention. FIG. 2 is a schematic cross-sectional view illustrating a boundary between the steel wire and the surface of the molten aluminum placed in a plating bath when the steel wire is drawn up from the molten aluminum in the method according to the present invention.

In the method for producing a hot-dip aluminum-coated steel wire according to the present invention, a hot-dip aluminum-coated steel wire 3 is produced by dipping a steel wire 2 in molten aluminum 1 placed in a plating bath 5, and then continuously drawing up the steel wire 2 from the molten aluminum 1.

Examples of steel used in the steel wire 2 include, for example, stainless steel, carbon steel and the like, and the present invention is not limited only to those exemplified ones.

The stainless steel is an alloy steel containing 10% by mass or more of chromium (Cr). Examples of the stainless steel include, for example, austenitic steel materials, ferritic steel materials and martensitic steel materials defined in JIS G4309 and the like, and the present invention is not limited only to those exemplified ones. Specific examples of the stainless steel include stainless steel in which an austenitic phase is generally considered to be metastable, such as SUS301 and SUS304; stable austenitic stainless steel such as SUS305, SUS310 and SUS316; ferritic stainless steel such as SUS405, SUS410, SUS429, SUS430, SUS434, SUS436, SUS444 and SUS447; martensitic stainless steel such as SUS403, SUS410, SUS416, SUS420, SUS431 and SUS440; chromium-nickel-manganese-based stainless steel classified into SUS200, and the like, and the present invention is not limited only to those exemplified ones.

The carbon steel contains 0.02% by mass or more of carbon (C). Examples of the carbon steel include, for example, high carbon steel wire rods defined in JIS G3506, low carbon steel wire rods defined in JIS G3505 and the like, and the present invention is not limited only to those exemplified ones. Specific examples of the carbon steel include high carbon steel, low carbon steel and the like, and the present invention is not limited only to those exemplified ones.

Among the above-mentioned steels, the stainless steel and the carbon steel are preferred from the viewpoint of increase in tensile strength of the hot-dip aluminum-coated steel wire 3.

The diameter of the steel wire 2 is not particularly limited. It is preferred that the diameter of the steel wire 2 is appropriately controlled in accordance with uses of the hot-dip aluminum-coated steel wire 3. For example, when the hot-dip aluminum-coated steel wire 3 is used in a wire harness of an automobile and the like, it is preferred that the diameter of the steel wire 2 is usually 0.05 to 0.5 mm or so.

A plating film (not illustrated) made of aluminum or an aluminum alloy is formed on the surface of the hot-dip aluminum-coated steel wire 3. In the present invention, since the plating film made of aluminum or an aluminum alloy is formed on the surface of the hot-dip aluminum-coated steel wire 3 as mentioned above, the hot-dip aluminum-coated steel wire 3 is excellent in adhesiveness to an aluminum element wire, tensile strength and temporal stability of electric resistance.

In FIG. 1, the steel wire 2 is provided from a sending device 4 of the steel wire 2. Thereafter, the steel wire 2 is continuously transferred in the direction of Arrow A, and dipped in the molten aluminum 1 placed in a plating bath 5. The steel wire 2 dipped in the molten aluminum 1 is drawn up from the surface 6 of the molten aluminum 1 vertically upward, to obtain a hot-dip aluminum-coated steel wire 3 in which the molten aluminum 1 is deposited on the surface of the steel wire 2.

The molten aluminum 1 may contain only aluminum. Alternatively, the molten aluminum 1 may contain an element other than aluminum (hereinafter referred to as other element) as occasion demands within a scope which would not hinder an object of the present invention.

Examples of the other element include, for example, nickel, chromium, zinc, silicon, copper, iron and the like, and the present invention is not limited only to those exemplified ones. When the other element is contained in aluminum, mechanical strength of the plating film can be increased, and moreover, tensile strength of the hot-dip aluminum-coated steel wire 3 can be increased. Among these other elements, although properties of the plating film depends on a kind of the steel wire 2, silicon is preferred from the viewpoint of suppression of generation of a brittle iron-aluminum alloy layer between iron contained in the steel wire 2 and aluminum contained in the plating film, increase in mechanical strength of the plating film and lowering in melting point of the molten aluminum 1, thereby increase in efficiency of plating of the steel wire 2.

The lower limit of the content of the other element in the plating film is 0% by mass. From the viewpoint of sufficient exhibition of properties based on the other element, the lower limit thereof is preferably 0.3% by mass or more, more preferably 0.5% by mass or more, and still more preferably 1% by mass or more. From the viewpoint of suppression of galvanic corrosion caused by contacting with an aluminum element wire, the upper limit thereof is preferably 50% by mass or less, more preferably 20% by mass or less, and still more preferably 15% by mass or less.

Incidentally, an element such as Fe, Cr, Ni, Zn or Cu may be inevitably incorporated in the molten aluminum 1.

When the steel wire 2 is drawn up from the molten aluminum 1, as illustrated in FIG. 2, a stabilization member 7 is contacted with the steel wire 2 at a boundary between the steel wire 2 and the surface 6 of the molten aluminum 1.

The stabilization member 7 includes, for example, a square rod made of stainless steel in which a heat-resistant cloth is wound around its surface, and the like. It is preferred that a virgin surface (new surface) of the heat-resistant cloth of the stabilization member 7 is contacted with the steel wire 2 from the viewpoint of suppression of deposition of an aluminum lump on the surface of the hot-dip aluminum-coated steel wire 3. The virgin surface (new surface) of the heat-resistant cloth can be formed on the surface of the stabilization member 7, for example, by contacting the stabilization member 7 having a previously wound heat-resistant cloth with the steel wire 2, and winding the heat-resistant cloth when the steel wire 2 is drawn up.

It is preferred that the stabilization member 7 is contacted with both of the surface 6 of the molten aluminum 1 and the steel wire 2 at the same time. When the stabilization member 7 is contacted with both of the surface 6 of the molten aluminum 1 and the steel wire 2 at the same time as mentioned above, pulsation of the surface 6 of the molten aluminum 1 can be suppressed, and minute vibration of the steel wire 2 is suppressed by the stabilization member 7 during drawing up the steel wire 2. Therefore, a plating film of the molten aluminum 1 can be uniformly formed on the surface of the steel wire 2. Incidentally, when the stabilization member 7 is contacted with the steel wire 2, it is preferred that the stabilization member 7 is slightly pressed toward the steel wire 2 in order to apply tension to the steel wire 2 as occasion demands from the viewpoint of suppression of minute vibration of the steel wire 2.

In the embodiment illustrated in FIG. 1, a nozzle 8 for blowing an inert gas to the boundary between the steel wire 2 and the surface 6 of the molten aluminum 1 is provided. The inert gas can be supplied, for example, from an inert gas supplying device 9 to the nozzle 8 through a pipe 10. In order to control the flow rate of the inert gas, the inert gas supplying device 9 or the pipe 10 can be equipped with a flow rate control device (not illustrated) such as a valve.

According to the present invention, since the distance (the shortest distance) from the steel wire 2 to a tip end 8a of the nozzle 8 and the temperature of the inert gas blown out from the tip end 8a of the nozzle 8 are appropriately controlled, and the inside diameter of the tip end 8a of the nozzle 8 and the volume flow rate of the inert gas blown out from the nozzle 8 are appropriately controlled, a hot-dip aluminum-coated steel wire 3 having a uniform diameter and little lump on its surface can be efficiently produced.

The inside diameter of the tip end 8a of the nozzle 8 is 1 mm or more, and preferably 2 mm or more, from the viewpoint of efficient production of a hot-dip aluminum-coated steel wire 3 by accurately blowing out an inert gas from the tip end 8a of the nozzle 8 to the boundary between the steel wire 2 and the surface 6 of the molten aluminum 1. The inside diameter of the tip end 8a of the nozzle 8 is 15 mm or less, preferably 10 mm or less, and more preferably 5 mm or less, from the viewpoint of production of a hot-dip aluminum-coated steel wire 3 having a uniform diameter and little lump on its surface.

The distance (the shortest distance) from the steel wire 2 to the tip end 8a of the nozzle 8 is 1 mm or more from the viewpoint of avoidance of the contact of the tip end 8a with the steel wire 2, and efficient production of the hot-dip aluminum-coated steel wire 3. The distance (the shortest distance) from the steel wire 2 to the tip end 8a of the nozzle 8 is 50 mm or less, preferably 40 mm or less, more preferably 30 mm or less, and still more preferably 10 mm or less, from the viewpoint of production of a hot-dip aluminum-coated steel wire 3 having a uniform diameter and little lump on its surface.

The inert gas means a gas which is inert to molten aluminum. Examples of the inert gas include, for example, nitrogen gas, argon gas, helium gas and the like, and the present invention is not limited only to those exemplified ones. Among the inert gases, nitrogen gas is preferable. The inert gas may contain, for example, oxygen gas, carbon dioxide gas or the like within a scope which would not hinder an object of the present invention.

The volume flow rate of the inert gas blown out from the tip end 8a of the nozzle 8 is 2 L (liter)/min or more, preferably 5 L/min or more, and more preferably 10 L/min or more, from the viewpoint of production of a hot-dip aluminum-coated steel wire 3 having a uniform diameter and little lump on its surface. The volume flow rate of the inert gas thereof is 200 L/min or less, preferably 150 L/min or less, and more preferably 100 L/min or less, from the viewpoint of suppression of deposition of an aluminum lump on the surface of the hot-dip aluminum-coated steel wire 3, due to scattering of the molten aluminum 1.

The temperature of the inert gas blown out from the tip end 8a of the nozzle 8 is 200° C. or higher, preferably 300° C. or higher, and more preferably 400° C. or higher, from the viewpoint of production of a hot-dip aluminum-coated steel wire 3 having a uniform diameter and little lump on its surface. The temperature of the inert gas thereof is 800° C. or lower, preferably 780° C. or lower, and more preferably 750° C. or lower, from the viewpoint of increase in thermal efficiency. Incidentally, the temperature of the inert gas discharged from the tip end 8a of the nozzle 8 is determined by inserting a thermocouple for measuring a temperature into the inert gas blown out from the tip end 8a of the nozzle 8 at the tip end 8a of the nozzle 8.

The speed for drawing-up the hot-dip aluminum-coated steel wire 3 from the surface 6 of the molten aluminum 1 is not particularly limited. It is preferred that the speed is appropriately controlled in accordance with the average thickness of an aluminum film formed on the surface of the hot-dip aluminum-coated steel wire 3. The average thickness of the aluminum film formed on the surface of the hot-dip aluminum-coated steel wire 3 can be appropriately controlled by adjusting the speed for drawing-up the hot-dip aluminum-coated steel wire 3.

In the present invention, even when the speed for drawing-up the hot-dip aluminum-coated steel wire 3 is controlled to be high, for example, controlled to a speed of 200 m/min or more, the hot-dip aluminum-coated steel wire 3 having a uniform wire diameter can be obtained. Therefore, the hot-dip aluminum-coated steel wire 3 can be efficiently produced by increasing the speed for drawing-up the hot-dip aluminum-coated steel wire 3. This shows that the method for producing a hot-dip aluminum-coated steel wire 3 of the present invention is excellent in industrial productivity of the hot-dip aluminum-coated steel wire 3.

Incidentally, as illustrated in FIG. 1, a cooling device 11 can be used as occasion demands in order to cool the hot-dip aluminum-coated steel wire 3 in the course of drawing up the hot-dip aluminum-coated steel wire 3, and efficiently solidify a plating film of the molten aluminum formed on the surface of the hot-dip aluminum-coated steel wire 3. The hot-dip aluminum-coated steel wire 3 can be cooled by blowing, for example, gas, liquid mist or the like to the hot-dip aluminum-coated steel wire 3 in the cooling device 11.

The hot-dip aluminum-coated steel wire 3 produced in the above can be collected by means of, for example, a winding device 12 or the like.

The average thickness of the aluminum film formed on the surface of the hot-dip aluminum-coated steel wire 3 is preferably 5 to 10 μm or so from the viewpoint of suppression of exposure of the steel wire 2 included in the hot-dip aluminum-coated steel wire 3 to the air in carrying out a process such as a wire stranding process, a crimpling process or the like, and increase in mechanical strength per unit diameter of the hot-dip aluminum-coated steel wire 3.

A plating layer can be formed as an intermediate layer between the steel wire 2 and the aluminum film of the hot-dip aluminum-coated steel wire 3. Examples of a metal used in the plating layer include, for example, zinc, nickel, chromium, an alloy thereof and the like, and the present invention is not limited only to those exemplified ones. The hot-dip aluminum-coated steel wire 3 may have only one plating layer on its surface, or may have plural plating layers made of the same or different metals on its surface.

The hot-dip aluminum-coated steel wire 3 obtained in the above can be conducted to a drawing process using dies as occasion demands, in order to control the diameter of the hot-dip aluminum-coated steel wire 3.

The hot-dip aluminum-coated steel wire 3 obtained in the present invention can be suitably used, for example, in a wire harness of an automobile and the like.

EXAMPLES

Next, the present invention will be more specifically described based on working examples. However, the present invention is not limited only to those working examples.

Examples 1 to 50 and Comparative Examples 1 to 8

A hot-dip aluminum-coated steel wire was produced based on the embodiment as illustrated in FIG. 1.

As a steel wire, a steel wire made of a high carbon steel containing 0.37% by mass of carbon, having a diameter listed in Tables 1 to 3 was used. A steel wire to which a plating treatment was not conducted was shown as "None" in the section "Pre-plating" of Tables 1 to 3. A steel wire having a zinc plating film of an average thickness of 5 μm or less was shown as "Zn" in the section "Pre-plating" of Tables 1 to 3. A steel wire having a nickel plating film of an average thickness of 5 μm or less was shown as "Ni" in the section "Pre-plating" of Tables 1 to 3. In Tables 1 to 3, a steel wire to which a reduction treatment was conducted was shown as "Performed". A steel wire to which reduction treatment was not conducted was shown as "None".

As a plating bath for aluminum hot-dipping, (a) a plating bath charged with molten aluminum having a purity of 99.7% or more, which was shown as "Al" in the section "Kind" in "Plating bath" of Tables 1 to 3, (b) a plating bath charged with molten aluminum containing 4% by mass of silicon, which was shown as "Al-1" in the section "Kind" in "Plating bath" of Tables 1 to 3, or (c) a plating bath charged with molten aluminum containing 11% by mass of silicon, which was shown as "Al-2" in the section "Kind" in "Plating bath" of Tables 1 to 3 was used.

The steel wire was transferred at a line speed (drawing-up speed of the steel wire) shown in Tables 1 to 3, and dipped in the molten aluminum having a bath temperature shown in Tables 1 to 3. Thereafter, the steel wire was drawn up from the molten aluminum. When a stabilization member (a square rod made of stainless steel, in which a heat-resistant cloth was wound around its surface) was contacted with the surface of the molten aluminum and the steel wire at the boundary between the steel wire and the surface of the molten aluminum, "Present" was shown in the section "Existence of stabilization member" of Tables 1 to 3. When the stabilization member was not contacted with the surface of the molten aluminum and the steel wire at the boundary between the steel wire and the surface of the molten aluminum, "None" was shown in the section "Existence of stabilization member" of Tables 1 to 3.

A nozzle having an inside diameter of the tip end shown in Tables 1 to 3 was disposed so that the tip end was placed at a position away from the steel wire by the distance (the shortest distance) shown in Tables 1 to 3. An inert gas (nitrogen gas) having a temperature shown in Tables 1 to 3 was blown out from the tip end of the nozzle to the boundary between the steel wire and the surface of the molten aluminum at a volume flow rate shown in Tables 1 to 3.

Thus, a hot-dip aluminum-coated steel wire having a plating film of an average thickness shown in Tables 1 to 3 was obtained. The thickness of the plating film was determined by measuring diameters at arbitrary five portions of the hot-dip aluminum-coated steel wire having a length of 100 mm by means of an optical outside-diameter measuring instrument manufactured by KEYENCE CORPORATION under the model number of LS-7000 at an interval of 0.1 mm, and subtracting the diameter of the steel wire before the formation of an aluminum film from the average of the diameter of the hot-dip aluminum-coated steel wire.

After the hot-dip aluminum-coated steel wire having a length of 3000 m was produced, operability during the production of the hot-dip aluminum-coated steel wire, and uniformity of a plating film and existence of an aluminum lump as the properties of the hot-dip aluminum-coated steel wire were examined in accordance with the following methods. The results are shown in Tables 1 to 3.

(1) Operability

When the inert gas was blown out from the tip end of the nozzle to the boundary between the steel wire and the surface of the molten aluminum, operability was evaluated in accordance with the following evaluation criteria.

[Evaluation Criteria]

O: Inert gas can be easily blown out exactly from the tip end of the nozzle to the boundary between the steel wire and the surface of the molten aluminum.

X: Inert gas cannot be easily blown out exactly from the tip end of the nozzle to the boundary between the steel wire and the surface of the molten aluminum.

(2) Uniformity of Plating Film

The thickness of the plating film was determined at arbitrary five portions of the hot-dip aluminum-coated steel wire having a length of 500 mm by means of an optical outside-diameter measuring instrument manufactured by KEYENCE CORPORATION under the model number of LS-7000 at an interval of 0.1 mm, and uniformity of plating film was evaluated in accordance with the following evaluation criteria.

[Evaluation Criteria]

O: Value of the ratio of (average diameter−minimum diameter)/(average diameter) is 0.10 or less.

X: Value of the ratio of (average diameter−minimum diameter)/(average diameter) is more than 0.10.

(3) Existence of Aluminum Lump

The hot-dip aluminum-coated steel wire was allowed to travel 3000 m at a line speed of 100 m/min, and the outside diameter of the hot-dip aluminum-coated steel wire was measured over the entire length of the hot-dip aluminum-coated steel wire. The hot-dip aluminum-coated steel wire was observed with the naked eyes to find out a portion where the outside diameter is locally increased. When a portion where the outside diameter is locally increased was found out, whether or not an aluminum lump was deposited to the portion was observed with the naked eyes, and existence of an aluminum lump was evaluated in accordance with the following evaluation criteria. Incidentally, the outside diameter of the hot-dip aluminum-coated steel wire was measured by means of an optical outside-diameter measuring instrument manufactured by KEYENCE CORPORATION under the model number of LS-7000.

[Evaluation Criteria]

O: Aluminum lump is not found.

X: Aluminum lump is found.

TABLE 1

| | Kind of steel wire | | | Plating bath | | | Nozzle | |
|---|---|---|---|---|---|---|---|---|
| | | | | | Bath | Line | Existence of | Inside |
| Example | Pre-plating | Reduction treatment | Diameter (mm) | Kind | temp. (° C.) | speed (m/min) | stabilization member | Distance (mm) | diameter (mm) |
| Ex. 1 | Zn | None | 0.20 | Al | 700 | 400 | Present | 2 | 3.2 |
| Ex. 2 | Zn | None | 0.20 | Al | 700 | 400 | Present | 2 | 3.2 |
| Ex. 3 | Zn | None | 0.20 | Al | 700 | 400 | Present | 2 | 3.2 |
| Ex. 4 | Zn | None | 0.20 | Al | 685 | 400 | Present | 2 | 3.2 |

TABLE 1-continued

| Example | Pre-plating | Reduction treatment | Diameter (mm) | Kind | Bath temp. (°C) | Line speed (m/min) | Existence of stabilization member | Distance (mm) | Inside diameter (mm) |
|---|---|---|---|---|---|---|---|---|---|
| Ex. 5 | Zn | None | 0.20 | Al | 720 | 400 | Present | 2 | 3.2 |
| Ex. 6 | Zn | None | 0.20 | Al-1 | 685 | 400 | Present | 2 | 3.2 |
| Ex. 7 | Zn | None | 0.20 | Al-2 | 685 | 400 | Present | 2 | 3.2 |
| Ex. 8 | Zn | None | 0.07 | Al | 700 | 600 | Present | 2 | 3.2 |
| Ex. 9 | Zn | None | 0.10 | Al | 700 | 600 | Present | 2 | 3.2 |
| Ex. 10 | Zn | None | 0.15 | Al | 700 | 600 | Present | 2 | 3.2 |
| Ex. 11 | Zn | None | 0.30 | Al | 700 | 400 | Present | 2 | 3.2 |
| Ex. 12 | Zn | None | 0.60 | Al | 700 | 300 | Present | 2 | 3.2 |
| Ex. 13 | Zn | None | 1.00 | Al | 700 | 300 | Present | 2 | 3.2 |
| Ex. 14 | None | Performed | 0.20 | Al | 700 | 400 | Present | 2 | 3.2 |
| Ex. 15 | Ni | None | 0.20 | Al | 700 | 400 | Present | 2 | 3.2 |
| Ex. 16 | Ni | Performed | 0.20 | Al | 700 | 400 | Present | 2 | 3.2 |
| Comp. Ex. 1 | Zn | None | 0.20 | Al | 700 | 400 | Present | 2 | 3.2 |

| | Inert gas | | Average thickness of plating film (μm) | Evaluation of hot-dip aluminum-coated steel wire | | |
|---|---|---|---|---|---|---|
| Example | Temp. (°C) | Volume flow rate (L/min) | | Operability | Uniformity of plating film | Existence of aluminum lump |
| Ex. 1 | 220 | 30 | 5.3 | ○ | ○ | ○ |
| Ex. 2 | 540 | 30 | 6.6 | ○ | ○ | ○ |
| Ex. 3 | 720 | 30 | 7.8 | ○ | ○ | ○ |
| Ex. 4 | 720 | 30 | 5.6 | ○ | ○ | ○ |
| Ex. 5 | 720 | 30 | 6.8 | ○ | ○ | ○ |
| Ex. 6 | 720 | 30 | 5.0 | ○ | ○ | ○ |
| Ex. 7 | 720 | 30 | 5.2 | ○ | ○ | ○ |
| Ex. 8 | 720 | 30 | 3.9 | ○ | ○ | ○ |
| Ex. 9 | 720 | 30 | 4.4 | ○ | ○ | ○ |
| Ex. 10 | 720 | 30 | 5.7 | ○ | ○ | ○ |
| Ex. 11 | 720 | 30 | 9.2 | ○ | ○ | ○ |
| Ex. 12 | 720 | 30 | 12.8 | ○ | ○ | ○ |
| Ex. 13 | 720 | 30 | 15.2 | ○ | ○ | ○ |
| Ex. 14 | 720 | 30 | 5.9 | ○ | ○ | ○ |
| Ex. 15 | 720 | 30 | 6.1 | ○ | ○ | ○ |
| Ex. 16 | 720 | 30 | 5.5 | ○ | ○ | ○ |
| Comp. Ex. 1 | 160 | 30 | 5.4 | ○ | x | x |

TABLE 2

| | Kind of steel wire | | | Plating bath | | | Nozzle | | |
|---|---|---|---|---|---|---|---|---|---|
| Example | Pre-plating | Reduction treatment | Diameter (mm) | Kind | Bath temp. (°C) | Line speed (m/min) | Existence of stabilization member | Distance (mm) | Inside diameter (mm) |
| Ex. 17 | Zn | None | 0.20 | Al | 700 | 400 | Present | 1 | 1.0 |
| Ex. 18 | Zn | None | 0.20 | Al | 700 | 400 | Present | 2 | 1.0 |
| Ex. 19 | Zn | None | 0.20 | Al | 700 | 400 | Present | 2 | 2.0 |
| Ex. 20 | Zn | None | 0.20 | Al | 700 | 400 | Present | 2 | 2.0 |
| Ex. 21 | Zn | None | 0.20 | Al | 700 | 400 | Present | 5 | 2.0 |
| Ex. 22 | Zn | None | 0.20 | Al | 700 | 400 | Present | 2 | 3.2 |
| Ex. 23 | Zn | None | 0.20 | Al | 700 | 400 | Present | 2 | 3.2 |
| Ex. 24 | Zn | None | 0.20 | Al | 700 | 400 | Present | 2 | 3.2 |
| Ex. 25 | Zn | None | 0.20 | Al | 700 | 400 | Present | 2 | 4.3 |
| Ex. 26 | Zn | None | 0.20 | Al | 700 | 400 | Present | 5 | 4.3 |
| Ex. 27 | Zn | None | 0.20 | Al | 700 | 400 | Present | 10 | 4.3 |
| Ex. 28 | Zn | None | 0.20 | Al | 700 | 400 | Present | 2 | 7.8 |
| Ex. 29 | Zn | None | 0.20 | Al | 700 | 400 | Present | 10 | 7.8 |
| Ex. 30 | Zn | None | 0.20 | Al | 700 | 400 | Present | 30 | 7.8 |
| Ex. 31 | Zn | None | 0.20 | Al | 700 | 400 | Present | 10 | 15 |
| Ex. 32 | Zn | None | 0.20 | Al | 700 | 400 | Present | 40 | 15 |
| Ex. 33 | Zn | None | 0.20 | Al | 700 | 400 | Present | 50 | 15 |
| Comp. Ex. 2 | Zn | None | 0.20 | Al | 700 | 400 | Present | 10 | 1.0 |
| Comp. Ex. 3 | Zn | None | 0.20 | Al | 700 | 400 | Present | 50 | 15 |
| Comp. Ex. 4 | Zn | None | 0.20 | Al | 700 | 400 | Present | 2 | 0.5 |
| Comp. Ex. 5 | Zn | None | 0.20 | Al | 700 | 400 | Present | 50 | 20 |

TABLE 2-continued

| | Inert gas | | Average | Evaluation of hot-dip aluminum-coated steel wire | | |
|---|---|---|---|---|---|---|
| Example | Temp. (° C.) | Volume flow rate (L/min) | thickness of plating film (μm) | Operability | Uniformity of plating film | Existence of aluminum lump |
| Ex. 17 | 220 | 2 | 4.3 | ○ | ○ | ○ |
| Ex. 18 | 220 | 5 | 3.9 | ○ | ○ | ○ |
| Ex. 19 | 220 | 5 | 5.2 | ○ | ○ | ○ |
| Ex. 20 | 220 | 10 | 9.4 | ○ | ○ | ○ |
| Ex. 21 | 220 | 20 | 6.0 | ○ | ○ | ○ |
| Ex. 22 | 220 | 10 | 12.2 | ○ | ○ | ○ |
| Ex. 23 | 220 | 20 | 10.4 | ○ | ○ | ○ |
| Ex. 24 | 220 | 40 | 8.6 | ○ | ○ | ○ |
| Ex. 25 | 220 | 20 | 15.4 | ○ | ○ | ○ |
| Ex. 26 | 220 | 40 | 9.7 | ○ | ○ | ○ |
| Ex. 27 | 220 | 60 | 6.0 | ○ | ○ | ○ |
| Ex. 28 | 220 | 40 | 12.9 | ○ | ○ | ○ |
| Ex. 29 | 220 | 60 | 8.8 | ○ | ○ | ○ |
| Ex. 30 | 220 | 100 | 7.9 | ○ | ○ | ○ |
| Ex. 31 | 220 | 100 | 10.2 | ○ | ○ | ○ |
| Ex. 32 | 220 | 150 | 9.9 | ○ | ○ | ○ |
| Ex. 33 | 220 | 200 | 9.0 | ○ | ○ | ○ |
| Comp. Ex. 2 | 220 | 1 | 9.5 | ○ | x | x |
| Comp. Ex. 3 | 220 | 300 | 13.4 | ○ | x | x |
| Comp. Ex. 4 | 220 | 2 | 3.3 | x | ○ | ○ |
| Comp. Ex. 5 | 220 | 200 | 11.0 | ○ | x | x |

TABLE 3

| | Kind of steel wire | | | Plating bath | | | | Nozzle | |
|---|---|---|---|---|---|---|---|---|---|
| Example | Pre-plating | Reduction treatment | Diameter (mm) | Kind | Bath temp. (° C.) | Line speed (m/min) | Existence of stabilization member | Distance (mm) | Inside diameter (mm) |
| Ex. 34 | Zn | None | 0.20 | Al | 700 | 400 | Present | 1 | 3.2 |
| Ex. 35 | Zn | None | 0.20 | Al | 700 | 400 | Present | 5 | 3.2 |
| Ex. 36 | Zn | None | 0.20 | Al | 700 | 400 | Present | 10 | 3.2 |
| Ex. 37 | Zn | None | 0.20 | Al | 700 | 400 | Present | 1 | 3.2 |
| Ex. 38 | Zn | None | 0.20 | Al | 700 | 400 | Present | 5 | 3.2 |
| Ex. 39 | Zn | None | 0.20 | Al | 700 | 400 | Present | 10 | 3.2 |
| Ex. 40 | Zn | None | 0.20 | Al | 700 | 400 | Present | 30 | 3.2 |
| Ex. 41 | Zn | None | 0.20 | Al | 700 | 400 | Present | 1 | 3.2 |
| Ex. 42 | Zn | None | 0.20 | Al | 700 | 400 | Present | 5 | 3.2 |
| Ex. 43 | Zn | None | 0.20 | Al | 700 | 400 | Present | 10 | 3.2 |
| Ex. 44 | Zn | None | 0.20 | Al | 700 | 400 | Present | 30 | 3.2 |
| Ex. 45 | Zn | None | 0.20 | Al | 700 | 400 | Present | 50 | 3.2 |
| Comp. Ex. 6 | Zn | None | 0.20 | Al | 700 | 400 | Present | 0.1 | 3.2 |
| Comp. Ex. 7 | Zn | None | 0.20 | Al | 700 | 400 | Present | 60 | 3.2 |
| Ex. 46 | Zn | None | 0.20 | Al | 700 | 400 | Present | 1 | 3.2 |
| Ex. 47 | Zn | None | 0.20 | Al | 700 | 400 | Present | 1 | 3.2 |
| Ex. 48 | Zn | None | 0.20 | Al | 700 | 400 | Present | 1 | 3.2 |
| Ex. 49 | Zn | None | 0.20 | Al | 700 | 400 | Present | 1 | 3.2 |
| Ex. 50 | Zn | None | 0.20 | Al | 700 | 400 | Present | 1 | 3.2 |
| Comp. Ex.. 8 | Zn | None | 0.20 | Al | 700 | 400 | Present | 1 | 3.2 |

| | Inert gas | | Average | Evaluation of hot-dip aluminum-coated steel wire | | |
|---|---|---|---|---|---|---|
| Example | Temp. (° C.) | Volume flow rate (L/min) | thickness of plating film (μm) | Operability | Uniformity of plating film | Existence of aluminum lump |
| Ex. 34 | 220 | 10 | 10.2 | ○ | ○ | ○ |
| Ex. 35 | 220 | 10 | 18.4 | ○ | ○ | ○ |
| Ex. 36 | 220 | 10 | 22.2 | ○ | ○ | ○ |
| Ex. 37 | 220 | 20 | 8.8 | ○ | ○ | ○ |

TABLE 3-continued

|  | | | | | | |
|---|---|---|---|---|---|---|
| Ex. 38 | 220 | 20 | 14.2 | ○ | ○ | ○ |
| Ex. 39 | 220 | 20 | 16.2 | ○ | ○ | ○ |
| Ex. 40 | 220 | 20 | 19.4 | ○ | ○ | ○ |
| Ex. 41 | 220 | 40 | 4.5 | ○ | ○ | ○ |
| Ex. 42 | 220 | 40 | 6.8 | ○ | ○ | ○ |
| Ex. 43 | 220 | 40 | 8.8 | ○ | ○ | ○ |
| Ex. 44 | 220 | 40 | 9.9 | ○ | ○ | ○ |
| Ex. 45 | 220 | 40 | 10.2 | ○ | ○ | ○ |
| Comp. Ex. 6 | 220 | 10 | 9.7 | x | ○ | ○ |
| Comp. Ex. 7 | 220 | 40 | 10.6 | ○ | x | x |
| Ex. 46 | 200 | 30 | 7.2 | ○ | ○ | ○ |
| Ex. 47 | 400 | 30 | 7.1 | ○ | ○ | ○ |
| Ex. 48 | 600 | 30 | 6.9 | ○ | ○ | ○ |
| Ex. 49 | 700 | 30 | 6.5 | ○ | ○ | ○ |
| Ex. 50 | 800 | 30 | 6.5 | ○ | ○ | ○ |
| Comp. Ex.. 8 | 100 | 30 | 6.9 | ○ | x | x |

From the results shown in Tables 1 to 3, according to the working examples, it can be seen that a hot-dip aluminum-coated steel wire having a uniform diameter and little aluminum lump on its surface can be efficiently produced.

Therefore, the hot-dip aluminum-coated steel wire obtained by the method for producing a hot-dip aluminum-coated steel wire of the present invention can be suitably used, for example, in a wire harness of an automobile and the like.

The present invention may be embodied in other specific forms without departing from the spirit or essential attributes thereof and, accordingly, reference should be made to the appended claims, rather than to the foregoing specification as indicating the scope of the present invention.

What is claimed is:

1. A method for producing a hot-dip aluminum-coated steel wire, the method comprising:
   dipping a steel wire in molten aluminum;
   after dipping the steel wire in the molten aluminum, continuously drawing up the steel wire from the molten aluminum to produce the hot-dip aluminum-coated steel wire;
   contacting, at the time of drawing up the steel wire from the molten aluminum, a stabilization member with a surface of the molten aluminum and the steel wire at a boundary between the steel wire and the surface of the molten aluminum; and
   blowing, from a nozzle having a tip end, an inert gas to the boundary between the steel wire and the surface of the molten aluminum;
   wherein the tip end of the nozzle has an inside diameter of 1 mm to 15 mm,
   wherein the nozzle is positioned apart from the steel wire, and disposed so that the tip end is positioned at a place away from the steel wire by a distance of 1 mm to 50 mm, and
   wherein the inert gas has a temperature of 200° C. to 800° C. and is blown out from the tip end at a volume flow rate of 2 L/min to 200 L/min.

* * * * *